(No Model.)

E. F. PICKETT.
VALVE FOR BICYCLES, &c.

No. 586,534. Patented July 13, 1897.

Witnesses.
Wm Hamilton Wright
Clarence Dufferin Rogers.

Inventor.
Edward Forbes Pickett

UNITED STATES PATENT OFFICE.

EDWARD FORBES PICKETT, OF BUFFALO, NEW YORK.

VALVE FOR BICYCLES, &c.

SPECIFICATION forming part of Letters Patent No. 586,534, dated July 13, 1897.

Application filed December 14, 1896. Serial No. 615,564. (No model.)

*To all whom it may concern:*

Be it known that I, EDWARD FORBES PICKETT, a citizen of the United States, residing at Buffalo, in the county of Erie, State of New York, have invented a new and Improved Air-Valve, of which the following is a specification.

My invention relates to improvements in air-valves used in bicycle-tires and the like, the object being to provide an air-valve constructed with the utmost simplicity, with no mechanism to get out of order, and capable of being inflated without the removal of any portion, while the valve may be removed from or replaced within the valve-case without detaching the latter from the tire.

Figure 3:
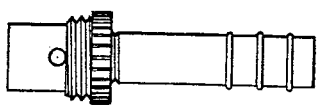
Figure 2:
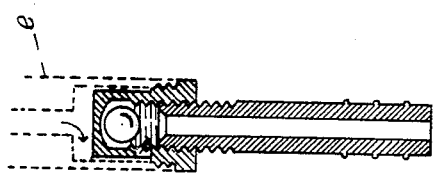
Figure 1:
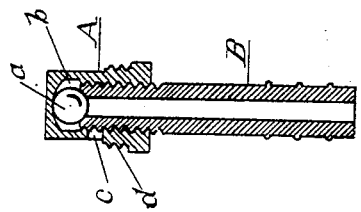

In the drawings, in which similar letters refer to similar parts, Figure 1 is a sectional view showing the valve closed and having the ordinary method of connection with the rubber stem which projects from the tire. Fig. 2 is another vertical section showing the valve open, with the pump $e$, as shown in dotted lines, connected to the dust-cap. Fig. 3 shows a general view of the valve.

The dust or end cap A is formed of metal, with a valve-chamber $b$ at the end of the bore, and contains a valve $a$, which can be made of any material. I prefer a rubber ball in this case, but a metal ball can be used and the valve-seat formed of elastic material, if so desired. The dust-cap is screwed on the end of the tube, where it will remain permanently engaged. A small air-passage $c$ is drilled in the side and closes when the dust-cap is screwed over the side of the tubular portion. The dust-cap is arranged with exterior screw-threads $d$ for the pump connection, leaving a small air-space surrounding the end of the dust-cap between the latter and the air-pump. The connection may be made, however, by tapering the raised portion or by providing the pump with an elastic washer to secure a tight abutment when the pump is passed over the dust-cap.

The tubular portion may be vulcanized to the tire with a temporary dust-cap and valve for use during vulcanization, after which the regular cap and valve may be placed on the tube.

I have used the word "dust-cap" as applied to the screw or closing cap which in ordinary valves closes the same against the admission of dust or water, &c., and have combined those qualities with the additional points herein specified.

I claim—

1. In an air-valve, composed of a tubular body, having the outermost end within the dust-cap formed with a valve-seat, in combination with a dust-cap permanently engaged with and inclosing the said valve-seated end, formed with a valve-chamber, a valve within the said chamber, an air-passage through the dust-cap adjustable to a point where it shall open interiorly between the said valve and valve-seat, and an annular raised portion for externally connecting the pump to the dust-cap.

2. In an air-valve composed of a tubular body, having the outermost extremity within the dust-cap formed with a tapering valve-seat, a closing and permanently-engaged dust-cap having a valve-chamber, an elastic ball-valve independently placed within the said chamber to engage with the said valve-seat, and held thereto by the said dust-cap, the said dust-cap externally threaded on a slightly-raised portion for pump connection, and an air-passage opening from the side of the dust-cap into the side of the valve-chamber at a point between the said valve and the exterior threads.

3. In an air-valve composed of a tubular body, a closing dust-cap designed for permanent engagement with the said tubular body, having a valve-receptacle and an independently-placed ball-valve within the said receptacle; the said dust-cap formed with an air-passage through the side at a point capable of being opened and closed as the said point in the dust-cap is turned from, or over the edge of the tubular body, and having an externally-raised portion or collar whereby the pump is connected and the air-passage and air-valve is opened and closed without removing the dust-cap.

EDWARD FORBES PICKETT.

Witnesses:
WILLIAM HAMILTON WRIGHT,
CLARENCE DUFFERIN ROGERS.